(12) United States Patent
Ueda et al.

(10) Patent No.: US 10,958,119 B2
(45) Date of Patent: Mar. 23, 2021

(54) ROTARY ELECTRIC MACHINE, ROTARY ELECTRIC MACHINE SYSTEM, AND MACHINE

(71) Applicant: Kabushiki Kaisha Toshiba, Minato-ku (JP)

(72) Inventors: Yasuhito Ueda, Yokohama (JP); Hiroshi Takahashi, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 685 days.

(21) Appl. No.: 15/690,917

(22) Filed: Aug. 30, 2017

(65) Prior Publication Data
US 2018/0198332 A1 Jul. 12, 2018

(30) Foreign Application Priority Data

Jan. 11, 2017 (JP) .............................. JP2017-002914

(51) Int. Cl.
*H02K 1/27* (2006.01)
*H02K 1/14* (2006.01)
(Continued)

(52) U.S. Cl.
CPC ............. *H02K 1/2713* (2013.01); *H02K 1/02* (2013.01); *H02K 1/04* (2013.01); *H02K 1/141* (2013.01);
(Continued)

(58) Field of Classification Search
CPC .. H02K 9/16; H02K 9/19; H02K 9/18; H02K 9/197; H02K 9/20; H02K 5/20; H02K 5/02; H02K 5/04; H02K 5/08; H02K 9/10; H02K 7/006; H02K 2201/12; H02K 7/1838; H02K 21/145; H02K 16/00; H02K 1/2713;
(Continued)

(56) References Cited

U.S. PATENT DOCUMENTS 3,737,695 A * 6/1973 Kilmer ................ H02K 21/145
                                              310/162
6,657,329 B2   12/2003 Kastinger et al.
(Continued)

FOREIGN PATENT DOCUMENTS

DE            39 04 516 C1   6/1990
DE      10 2006 022 836 A1   11/2007
(Continued)

*Primary Examiner* — Bryan R Perez
(74) *Attorney, Agent, or Firm* — Oblon, McClelland, Maier & Neustadt, L.L.P.

(57) ABSTRACT

A rotary electric machine in an embodiment includes a stator, and a rotor capable of rotating around a rotation center. The rotor includes a first rotor core, a second rotor core, and a magnet. The first rotor core includes first rotor magnetic poles that are arranged being spaced apart from one another in a circumferential direction and that face first stator magnetic poles, and is annular. The second rotor core includes second rotor magnetic poles that are arranged being spaced apart from one another in the circumferential direction and that face second stator magnetic poles, and is annular. The magnet is located between the first rotor core and the second rotor core and provided with a slit-like magnet separation portion that separates at least a part thereof in the circumferential direction, and is annular.

9 Claims, 14 Drawing Sheets

(51) Int. Cl.
  *H02K 1/02* (2006.01)
  *H02P 25/022* (2016.01)
  *H02K 1/24* (2006.01)
  *H02K 21/14* (2006.01)
  *H02K 19/10* (2006.01)
  *H02K 16/00* (2006.01)
  *H02K 1/04* (2006.01)
  *H02P 25/024* (2016.01)
  *H02K 7/00* (2006.01)
  *H02K 7/18* (2006.01)

(52) U.S. Cl.
  CPC ............... *H02K 1/145* (2013.01); *H02K 1/24* (2013.01); *H02K 16/00* (2013.01); *H02K 19/10* (2013.01); *H02K 21/145* (2013.01); *H02P 25/022* (2013.01); *H02P 25/024* (2016.02); *H02K 7/006* (2013.01); *H02K 7/1838* (2013.01); *H02K 2201/12* (2013.01)

(58) Field of Classification Search
  CPC ............ H02K 1/04; H02K 1/145; H02K 1/02; H02K 1/141; H02K 1/24; H02P 25/022; H02P 25/024
  USPC ...... 310/52, 54, 58, 59, 12.29, 12.01, 89, 64
  See application file for complete search history.

(56) References Cited

U.S. PATENT DOCUMENTS

| | | |
|---|---|---|
| 10,230,279 B2 | 3/2019 | Yoshizawa et al. |
| 2002/0113520 A1* | 8/2002 | Kastinger ............ H02K 21/145 310/254.1 |
| 2005/0040720 A1 | 2/2005 | Dubois et al. |
| 2007/0267929 A1 | 11/2007 | Pulnikov et al. |
| 2008/0238234 A1 | 10/2008 | Saban et al. |
| 2009/0072647 A1* | 3/2009 | Hino ....................... B60L 50/16 310/156.15 |
| 2011/0156503 A1* | 6/2011 | Pfleger ................. H02K 15/022 310/43 |
| 2014/0217859 A1* | 8/2014 | Saito ....................... H02K 1/276 310/68 D |
| 2015/0171677 A1* | 6/2015 | Moon ................... H02K 1/2706 310/156.38 |
| 2015/0288233 A1* | 10/2015 | Kim ..................... H02K 1/2766 310/156.43 |
| 2016/0172911 A1 | 6/2016 | Yoshizawa et al. |
| 2017/0267493 A1 | 9/2017 | Takahashi et al. |

FOREIGN PATENT DOCUMENTS

| | | |
|---|---|---|
| JP | 8-70541 A | 3/1996 |
| JP | 9-308150 A | 11/1997 |
| JP | 10-285848 A | 10/1998 |
| JP | 11-252835 A | 9/1999 |
| JP | 2000-69719 A | 3/2000 |
| JP | 2001-178040 A | 6/2001 |
| JP | 2003-533162 A | 11/2003 |
| JP | 2005-57955 A | 3/2005 |
| JP | 2005-304136 A | 10/2005 |
| JP | 2005-318760 A | 11/2005 |
| JP | 2008-517573 A | 5/2008 |
| JP | 2008-245488 A | 10/2008 |
| JP | 2009-225543 A | 10/2009 |
| JP | 2010-213509 A | 9/2010 |
| JP | 2013-55833 A | 3/2013 |
| JP | 2014-64427 A | 4/2014 |
| JP | 2014-117131 A | 6/2014 |
| JP | 2014-165974 A | 9/2014 |
| JP | 2016-106522 A | 6/2016 |
| JP | 2016-149919 A | 8/2016 |
| JP | 2017-169343 A | 9/2017 |
| WO | WO 2006/040584 A1 | 4/2006 |
| WO | WO 2014/188995 A1 | 11/2014 |

* cited by examiner

ROTARY ELECTRIC MACHINE, ROTARY ELECTRIC MACHINE SYSTEM, AND MACHINE

CROSS-REFERENCE TO RELATED APPLICATIONS

This application is based upon and claims the benefit of priority from Japanese Patent Application No. 2017-002914, filed on Jan. 11, 2017; the entire contents of which are incorporated herein by reference.

FIELD

Embodiments described herein relate generally to rotary electric machine, a rotary electric machine system, and a machine.

BACKGROUND

Conventionally, as a rotary electric machine, a transverse-flux rotary electric machine has been known, for example.

It is beneficial that a rotary electric machine of a smaller eddy-current loss in a permanent magnet is obtainable.

DETAILED DESCRIPTION

Figure 1:
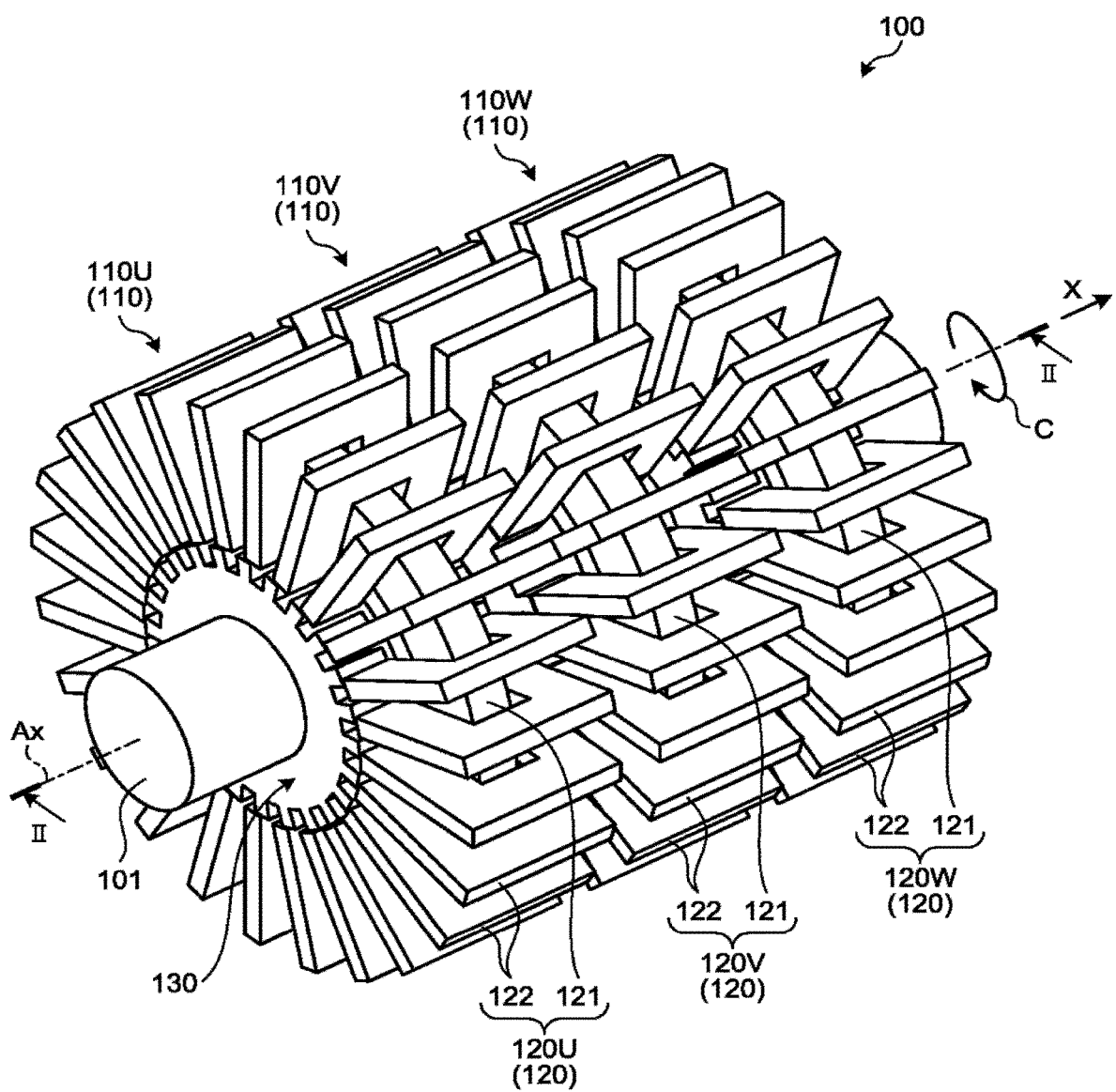
FIG. 1 is a schematic and exemplary perspective view of a rotary electric machine according to a first embodiment.

A rotary electric machine in an embodiment includes a stator, and a rotor capable of rotating around a rotation center. The rotor includes a first rotor core, a second rotor core, and a magnet. The first rotor core includes first rotor magnetic poles that are arranged being spaced apart from one another in a circumferential direction and that face first stator magnetic poles, and is annular. The second rotor core includes second rotor magnetic poles that are arranged being spaced apart from one another in the circumferential direction and that face second stator magnetic poles, and is annular. The magnet is located between the first rotor core and the second rotor core and provided with a slit-like magnet separation portion that separates at least a part thereof in the circumferential direction, and is annular.

The following discloses exemplary embodiments of the present invention. The configurations and control in the following embodiments exemplified (technical features), as well as the operation and results (effects) that are brought about by such configurations and control, are mere examples. The embodiments and modifications illustrated in the following include the same constituent elements. Accordingly, for the same constituent elements, common reference signs are given to and the redundant explanations thereof are omitted.

In the drawings, arrows indicative of directions are illustrated. An axial direction (one thereof) of a rotation center Ax is indicated with a direction (FIG. 1 and others), an outward radial direction of the rotation center Ax is indicated with a direction R (FIG. 5 and others), and a circumferential direction of the rotation center Ax is indicated with a direction C (FIG. 1 and others, a clockwise direction when viewed in the direction X). In the following description, the axial direction of the rotation center Ax is simply referred to as the axial direction, the radial direction of the rotation center Ax is simply referred to as the radial direction, and the circumferential direction of the rotation center Ax is simply referred to as the circumferential direction. The axial direction is a direction in parallel with the rotation center Ax, the radial direction is a direction orthogonal to the rotation center Ax, and the circumferential direction is a direction along the circumference centering the rotation center Ax.

First Embodiment

FIG. 1 is a perspective view illustrating a rotary electric machine 100 according to a first embodiment. The rotary electric machine 100 in the first embodiment is a transverse-flux rotary electric machine.

The rotary electric machine 100 includes a shaft 101, and a plurality of (three, for example) driving elements 110 (110U, 110V, 110W) that rotatively drive the shaft 101. The rotary electric machine 100 has a plurality of phases (three, for example), and the driving elements 110 correspond to the respective phases. The rotary electric machine 100 further includes a housing not depicted. The housing accommodates a plurality of driving elements 110 and rotatively supports the shaft 101. The rotary electric machine 100 functions as a motor or a generator.

Figure 2:
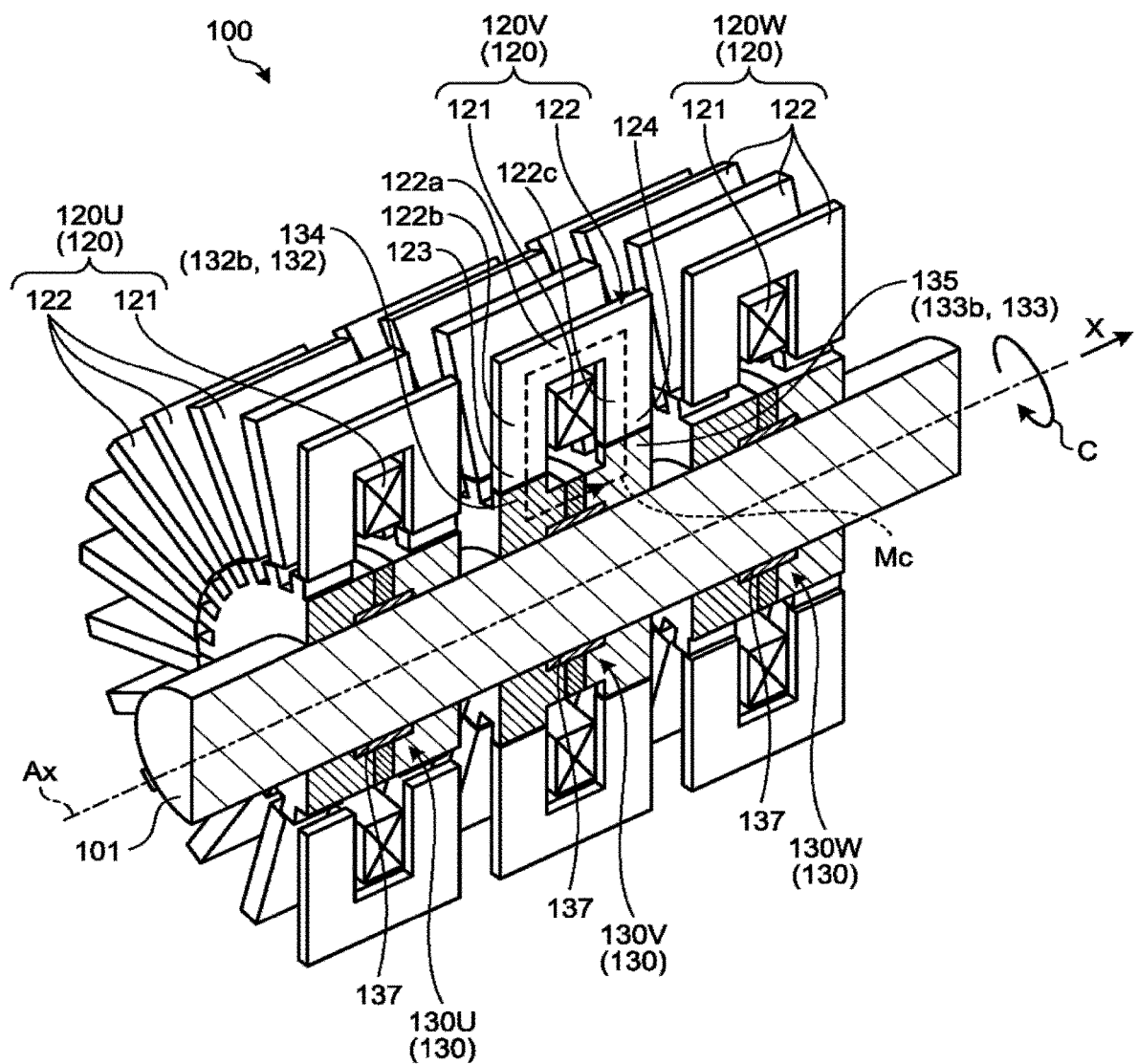
FIG. 2 is a schematic and exemplary perspective view illustrating a cross-section of the rotary electric machine in the first embodiment.

FIG. 2 is a perspective view of a cross-section passing through the rotation center Ax of the rotary electric machine 100 and is a cross-sectional view viewed along the line II-II in FIG. 1. As illustrated in FIG. 2, the driving elements 110 each include a stator 120 (120U, 120V, 120W) and a rotor 130 (130T, 130V, 130W). That is, the rotary electric machine 100 includes a plurality of (three, for example) pairs of the stator 120 and the rotor 130 that are in line in the axial direction.

Stator

As illustrated in FIGS. 1 and 2, the stator 120 includes a winding 121 and a plurality of iron cores 122.

The winding 121 includes a conducting wire that is wound a plurality of times in an annular form centering the rotation center Ax. The shape of the winding 121 is a circular ring shape along the circumferential direction centering the rotation center Ax. The winding 121 can be referred to as a stator winding also.

The winding 121 is provided for each stator 120, that is, each phase. On a plurality of windings 121, applied is AC power of a phase different from one another. In the first embodiment, as one example, on each of the three windings 121, the AC power having the phase differences of +120° and −120° to the other two is applied. The AC power applied to the windings 121 of a plurality of phases is not limited to this example.

A plurality of iron cores 122 is in line in the circumferential direction spaced apart at substantially regular intervals. The shape of the iron core 122 is a U-shape that is open inward in the radial direction. The iron cores 122 surround the winding 121 with space left from the outside direction in the radial direction. The iron core 122 is one example of a stator core.

As illustrated in FIG. 2, the iron core 122 includes a first portion 122a, a second portion 122b, and a third portion 122c. The first portion 122a is located away outward in the radial direction of the winding 121, and extends substantially along the axial direction. The first portion 122a can be referred to as a bottom portion also. The second portion 122b is located away in one (rear in the X direction) of the axial direction of the winding 121, and is projecting inward in the radial direction from one end portion in the axial direction of the first portion 122a. The third portion 122c is located away in the other (front in the X direction) of the axial direction of the winding 121, and is projecting inward in the radial direction from the other end portion in the axial direction of the first portion 122a. The second portion 122b and the third portion 122c can be referred to as arm portions also.

The inward end portion in the radial direction of the second portion 122b is a magnetic pole 123 and the inward end portion in the radial direction of the third portion 122c is a magnetic pole 124. That is, the iron core 122 extends between the magnetic pole 123 and the magnetic pole 124 and surrounds the winding 121. These magnetic poled 123 and 124 are magnetic boles facing the rotor 130. The magnetic pole 123 is one example of a first stator magnetic pole, and the magnetic pole 124 is one example of a second stator magnetic pole.

Rotor

Figure 3:
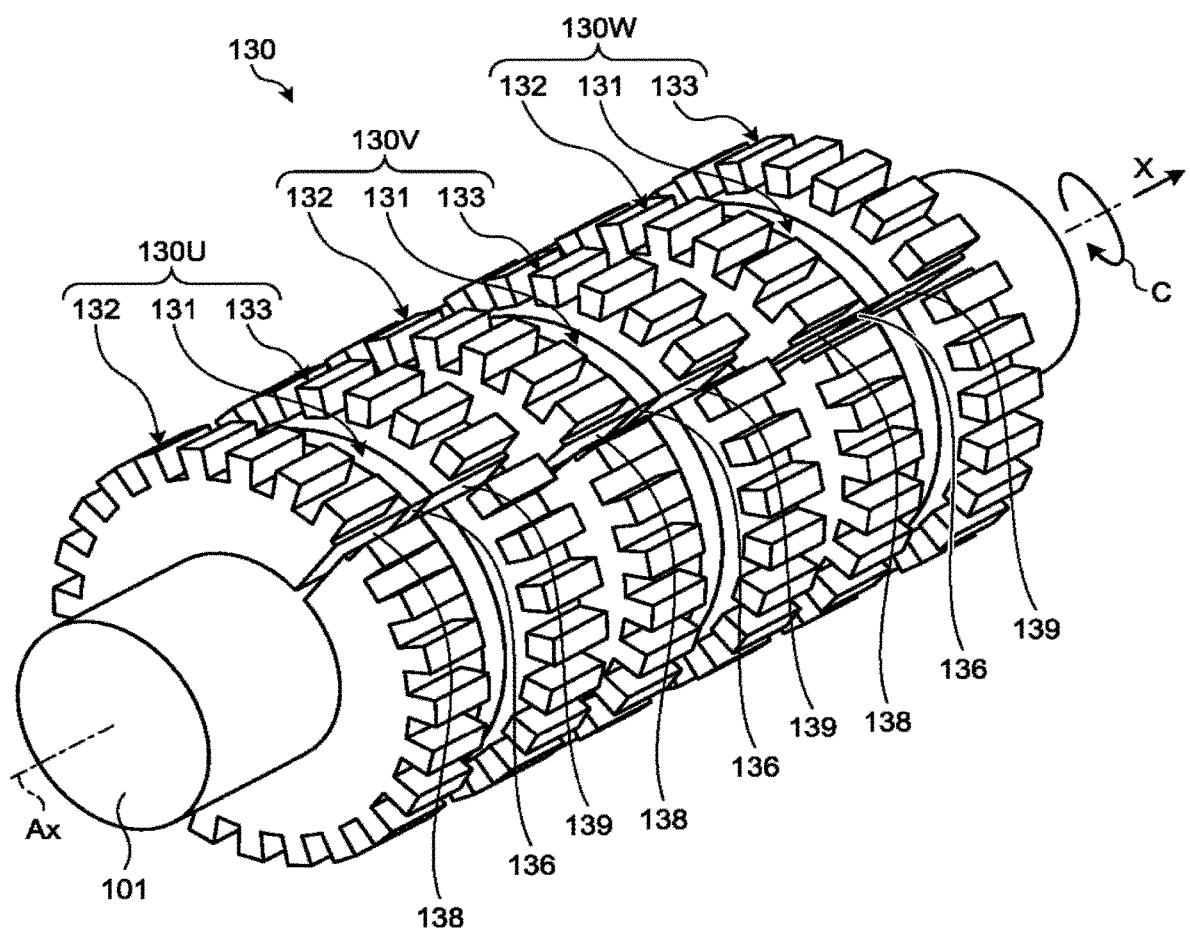
FIG. 3 is a schematic and exemplary perspective view of a rotor of the rotary electric machine in the first embodiment.
Figure 4:
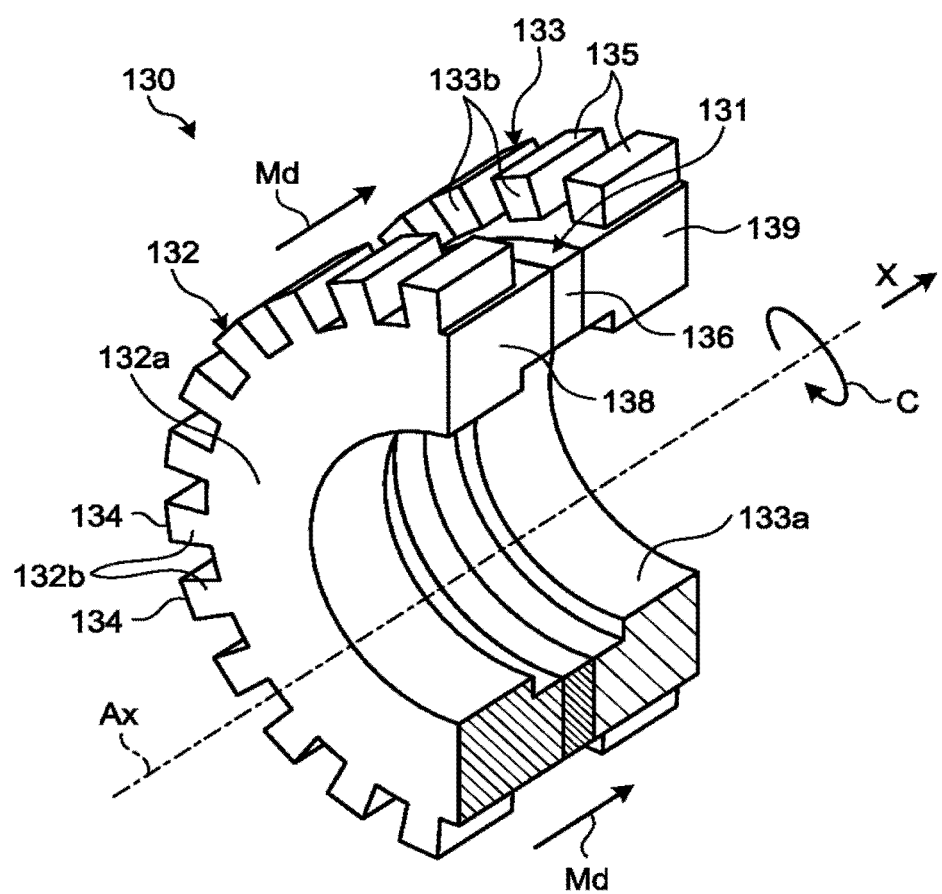
FIG. 4 is a schematic and exemplary perspective view illustrating a cross-section of a configuration of one phase portion of the rotor in the rotary electric machine in the first embodiment.

FIG. 3 is a perspective view of the rotor 130. FIG. 4 is a cross-sectional view of the configuration of one phases portion of the rotor 130. As illustrated in FIGS. 2 to 4, the rotor 130 includes a magnet 131, a first iron core 132, and a second iron core 133.

The rotor 130 is fixed to the shaft 101. That is, the rotor 130 rotates about the rotation center Ax together with the shaft 101. The shaft center of the shaft 101 coincides with the rotation center Ax. The shape of the shaft 101 is a columnar and rod-like shape. The shaft 101 is composed of a nonmagnetic material, as one example. Between the shaft 101 and the magnet 131, the first iron core 132, and the second iron core 133, an insulation layer or an insulative inclusion can be inserted. It can be said that the shaft 101 is also a part of the rotor 130.

The magnet 131 is a permanent magnet, and is a rare earth-based sintered magnet having a high magnetic energy product, as one example. The shape of the magnet 131 is a circular ring shape along the circumferential direction centering the rotation center Ax.

The first iron core 132 is adjacent to the magnet 131 in one of the axial direction (rear in the X direction). The shape of the first iron core 132 is a circular ring shape along the circumferential direction centering the rotation center Ax. The first iron core 132 is one example of a first rotor core.

As illustrated in FIG. 4, the first iron core 132 includes a first portion 132a and a plurality of second portions 132b. The shape of the first portion 132a is a circular ring shape centering the rotation center Ax. The second portion 132b is projecting outward in the radial direction from the circumferential edge portion of the first portion 132a. A plurality of second portions 132b are in line in the circumferential direction spaced apart at substantially regular intervals. The second portions 132b can also be referred to as a tooth portion or projections.

The second iron core 133 is adjacent to the magnet 131 in the other of the axial direction (front in the X direction). The shape of the second iron core 133 is a circular ring shape along the circumferential direction centering the rotation center Ax. The second iron care 133 is one example of a second rotor core.

The second iron core 133 includes a first portion 133a and a plurality of second portions 133b. The shape of the first portion 133a is a circular ring shape centering the rotation center Ax. The second portion 133b is projecting outward in the radial direction from the circumferential edge portion of the first portion 133a. A plurality of second portions 133b are in line in the circumferential direction spaced apart at substantially regular intervals. The second portions 133b can also be referred to as a tooth portion or projections.

The magic 131 is magnetized in the axial direction. In the first embodiment, as illustrated in FIG. 4, the magnet 131 is magnetized in a direction Md (front in the X direction) as a whole, as one example.

As apparent from FIG. 4, the first portion 132a of the first iron core 132, the magnet 131, and the first portion 133a of the second iron core 133 are adjacent in the axial direction, are in line in the axial direction, are overlapping in the axial direction, and constitute a series of cylindrical portions. Toroidal contact surfaces of the first portion 132a and the magnet 131 and toroidal contact surfaces of the first portion 133a and the magnet 131 are substantially in the same size and are substantially in the same shape. With such a configuration, it is possible to suppress the leakage of magnetic flux of the magnet 131.

The outward end portion in the radial direction of the second portion 132b in the first iron core 132 functions as a magnetic pole 134 of the first iron core 132, and the outward end portion in the radial direction of the second portion 133b in the second iron core 133 functions as a magnetic pole 135 of the second iron core 133. As illustrated in FIG. 2, the magnetic pole 34 faces the magnetic pole 123 of the second portion 122b in the iron core 122 of the stator 120 in the radial direction with a gap left. The magnetic pole 135 also faces the magnetic pole 124 of the third portion 122c in the iron core 122 of the stator 120 in the radial direction with a gap left. The magnetic poles 134 and 135 are magnetic poles facing the stator 120, and can also be referred to as salient poles. The magnetic pole 134 is one example of a first rotor magnetic pole, and the magnetic pole 135 is one example of a second rotor magnetic pole.

With such a configuration, in each phase, that is, in each iron core 122 of each driving element 110, a magnetic circuit Mc illustrated in FIG. 2 is formed extending between the stator 120 and the rotor 130. The direction of the magnetic circuit Mc is determined by the relation between the electrical power applied to the winding 121 and the magnetized direction of the magnet 131 acid the like.

Figure 5:
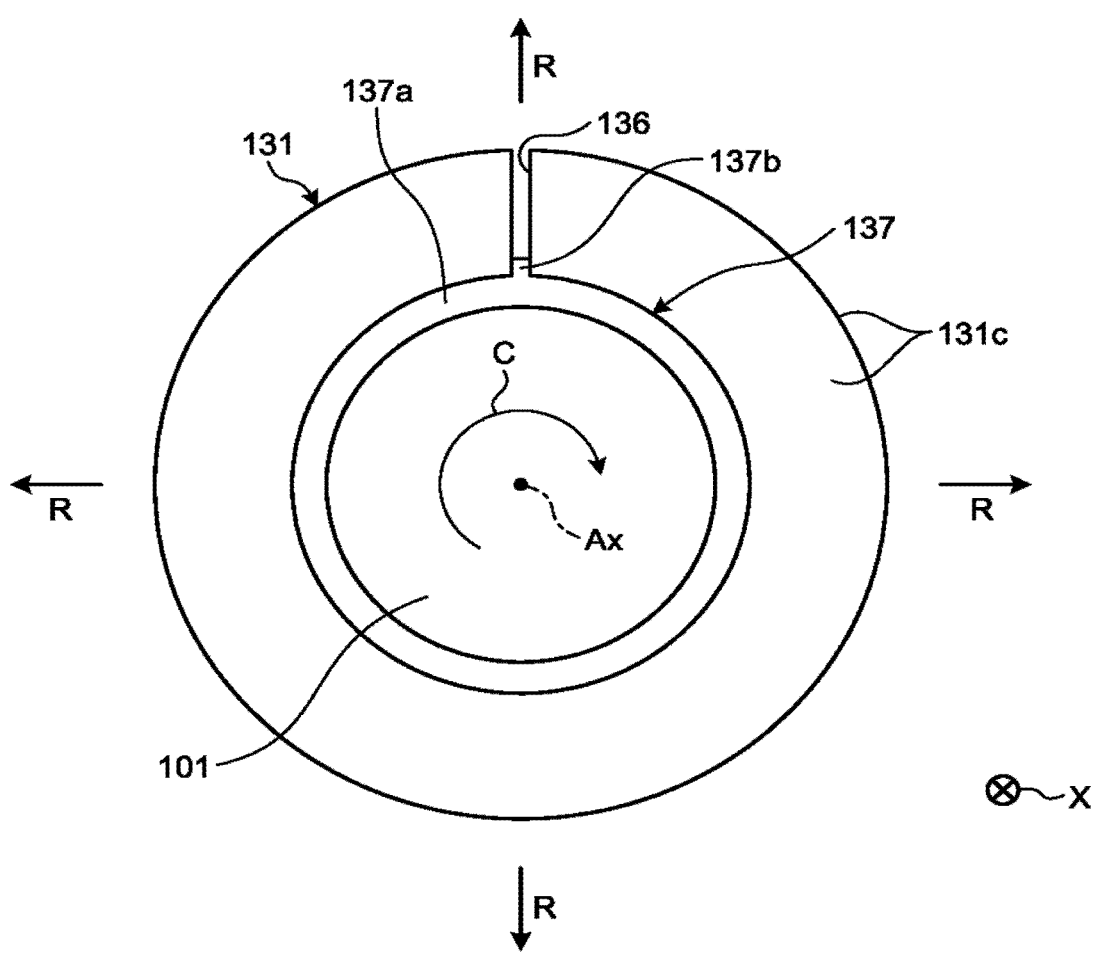
FIG. 5 is a schematic and exemplary front view illustrating a magnet and a supporting member in the rotary electric machine in the first embodiment.

FIG. 5 is a front view of the magnet 131 and a supporting member 137. As illustrated in FIG. 5, the shape of the supporting member 137 is a circular ring shape. The supporting member 137 includes an annular portion 137*a* and a protrusion 137*b*.

The annular portion 137*a* is in a circular ring shape centering the rotation center Ax. The annular portion 137*a* is located between the shaft 101 and the magnet 131. The inner circumferential surface of the annular portion 137*a* is in contact with the cuter circumferential surface of the shaft 101, and the outer circumferential surface of the annular portion 137*a* is in contact with the inner circumferential surface of the magnet 131. The protrusion 137*b* is projecting outward in the radial direction from the circumferential edge portion of the annular portion 137*a*.

The supporting member 137 integrally fixes the shaft 101 and the magnet 131. That is, the supporting member 137 can be referred to as a coupling member also. The supporting member 137 is composed of an insulative material, such as an insulative synthetic resin material, as one example. The shaft 101, the supporting member 137, and the magnet 131 are coupled with one another by press fitting, adhesive bonding, mechanical coupling, and others, for example. Furthermore, for example, like a coating of an insulation layer provided on the surface of the supporting member 137, at least a part of a contact region of the supporting member 137 contacting with the magnet 131 may be composed of an insulative material.

In the above-described configuration, as illustrated in FIG. 2, the magnet 131 is coaxially arranged with the winding 121 and is located in a path of magnetic flux generated by the excitation of the winding 121. Thus, when the magnet 131 configures a closed path along the circumferential direction, on the surface of the magnet 131 or in the inside thereof, a strong eddy current is induced in a direction of counteracting the excited magnetic flux in the circumferential direction and in the winding 121. Such an eddy current becomes a factor of decreasing the torque of the rotary electric machine 100.

Consequently, in the first embodiment, in order to suppress the occurrence of such an eddy current in the magnet 131, slit 136 as illustrated in FIGS. 3 and 5 is provided on the magnet 131. The slit 136 extends along the radial direction and the axial direction, and at the position where the slit 136 is provided, separates the magnet 131 in the circumferential direction. The slit 136 is one example of a magnet separation portion. Note that the separation means that the magnet 131 is not connected. That is, at the region where the slit 136 is provided, the end face on one of the circumferential direction of the magnet 131 and the end face on the other are spaced apart from each other via the slit 136.

As in the foregoing, in the first embodiment, the slit 136 (magnet separation portion) electrically separates (isolates), at the position where the slit 136 is provided, the magnet 131 in the circumferential direction. According to such a configuration, it is possible to suppress the occurring of an eddy current on the magnet 131 along the circumferential direction, and eventually, it is possible to suppress the decrease in the torque of the rotary electric machine 100 by the eddy current.

Furthermore, in the first embodiment, on the surface (outer surface) of the magnet 131, an insulation layer 131*c* (FIG. 5) may be provided. The insulation layer 131*c* is a film, a sheet, coating, and others of an insulative material such as paper, for example. Supposing that, when an eddy current including a current path bypassing the slit 136 that is provided on the magnet 131 is formed in a member other than the magnet 131 (for example, the first iron core 132, the second iron core 133, the supporting member 137, and the shaft 101), it is not possible to suppress the decrease in the torque of the rotary electric machine 100 due to the eddy current. In terms of this point, according to the configuration in which the insulation layer 131*c* is provided on the surface of the magnet 131, it is possible to electrically interrupt between the magnet 131 and another member more easily and more reliably. Thus, it is possible to suppress the occurring of an eddy current in which a current path that flows through the first iron core 132, the second iron core 133, the supporting member 137, the shaft 101, and others bypassing the alit 136 and a current path that flows through the portions other than the slit 136 in the magnet 131 are connected. That is, according to such a configuration, it is possible to suppress the decreasing in the torque of the rotary electric machine 100 due to an eddy current flowing through the magnet 131. The insulation layer 131*c* may be provided on a part of the surface of the magnet 131 or may be provided on a whole surface.

In the first embodiment, as illustrated in FIG. 5, the protrusion 137*b* provided on the supporting member 137 is inserted in the slit 136. The protrusion 137*b* functions as a retaining portion that retains the gap of the slit 136 and also functions as a positioning portion that performs positioning of the magnet 131 with respect to the supporting member 137, eventually the shaft 101. The protrusion 137*b* (supporting member 137) is one example of an inclusion that intervenes in the slit 136. Accordingly, by the protrusion 137*b*, it is possible to suppress the occurring of an eddy current on the magnet 131 along the circumferential direction, as both end faces of the slit 136 come in contact with each other by the thermal deformation of the magnet 131, external force, and others. The inclusion in the slit 136 may be a member other than the supporting member 137, and may be of the size extending over a whole of the slit 136. The inclusion may be an insulative magnet magnetized in parallel with the magnet 131, such as a ferrite magnet, for example.

In the first embodiment, the magnet 131 is supported by the supporting member 137 for which at least the contact region contacting with the magnet 131 is composed of an insulative material. According to such a configuration, the magnet 131 on which the slit 136 is provided can be fitted to the rotor 130 via the supporting member 137 more easily, more rapidly, or more solidly, for example. Furthermore, it is possible to suppress the occurring of an eddy current in which a current path that flows through the supporting member 137 bypassing the slit 136 and a current path that flows through the portions other than the slit 136 in the magnet 131 are connected, for example. That is, according to such a configuration, it is possible to suppress the decreasing in the torque of the rotary electric machine 100 due to an eddy current flowing through the magnet 131.

In the first embodiment, the shaft adjacent to the magnet 131 is of a nonmagnetic material. According to such a configuration, it is possible to suppress the leakage of magnetic flux by the magnet 131.

In the first embodiment, as illustrated in FIGS. 3 and 4, the first iron core 132 and the second iron core 133 are provided with slits 138 and 139, respectively, that are adjacent to the slit 136 of the magnet 131 in the axial direction. The slit 138 separates the first iron core 132 in the circumferential direction, and the slit 139 separates the second iron core 133 in the circumferential direction. According to such a configuration, it is possible to suppress the occurring of an eddy current in which a current path that flows through the first iron core 132 and the second iron core 133 bypassing the slit 136 and a current path that flows through the portions other than the slit 136 in the magnet 131 are connected. That is, according to such a configuration, it is possible to suppress the decreasing in the torque of the rotary electric machine 100 due to an eddy current flowing through the magnet 131. The slits 138 and 139 are examples of an iron-core separation portion.

In the first embodiment, at least one out of the iron core 122 (stator core), the first iron core 132 (first rotor core), and the second iron core 133 (second rotor core) can be composed, at least partially, of a powder magnetic core or a ferrite core. The electrical resistivity of the powder magnetic core and the ferrite core Is dramatically nigh as compared with laminated steel sheets and bulk electromagnetic soft iron that are general as an iron core material. Thus, according to such a configuration, it is possible to effectively suppress an eddy current on the surface of or on the inside of the powder magnetic core and the ferrite core.

In the first embodiment, in the above-described configuration in which the current bypassing the slit 136 of the magnet 131 is not likely to occur, for example, in the configuration in which an insulation layer not depicted is provided on the surface of the magnet 131 and the configuration in which the slit 138 or 139 is provided on the first iron core 132 or the second iron core 133, in tents of obtaining a higher magnetic flux density, there may be a case in which it is better that at least one of the iron core 122, the first iron core 132, and the second iron core 133 is composed of the laminated steel sheets, bulk electromagnetic soft iron, ferromagnetic body having magnetic anisotropy, and others, rather than the powder magnetic core and the ferrite core.

Modification

Figure 6:
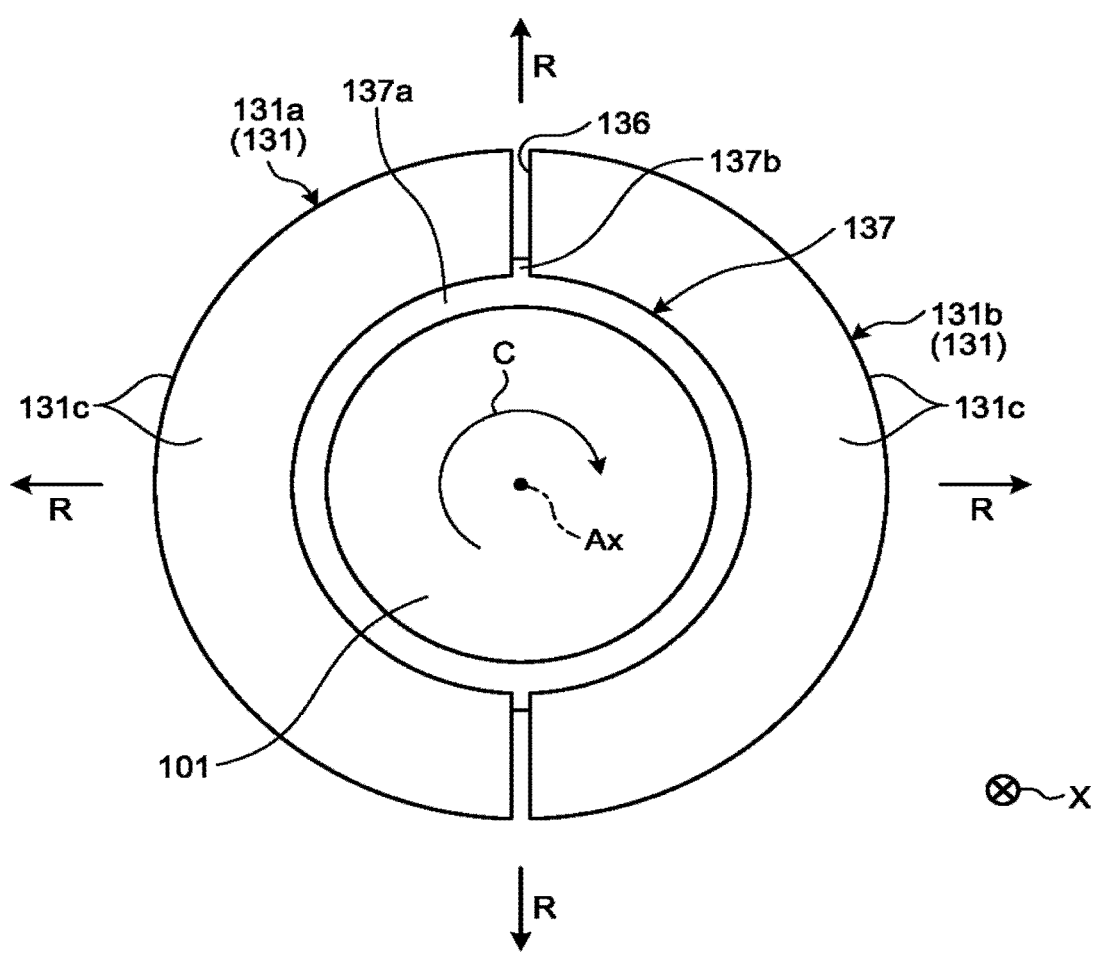
FIG. 6 is a schematic and exemplary front view illustrating a modification of the magnet and the supporting member in the rotary electric machine in the first embodiment.

FIG. 6 is a front view of the magnet 131 and the supporting member 137 according to a modification of the first embodiment. As illustrated in FIG. 6, in the modification, the magnet 131 is provided with a plurality of slits 136. In the example illustrated in FIG. 6, two slits 136 are provided for each 180° around the rotation center Ax.

Even with such a configuration, it is possible to suppress the decrease in the torque of the rotary electric machine 100 due to an eddy current that locally flows in the circumferential direction in the magnet 131. Because the magnet 131 includes a plurality of segmented bodies 131a and 131b, there is an advantage in that the segmented bodies 131a and 131b are easily fitted to the shaft 101 and the supporting member 137 from the outside in the radial direction. The supporting member 137 may be provided with the slits 136 of three or more.

Rotary Electric Machine System

Figure 7:
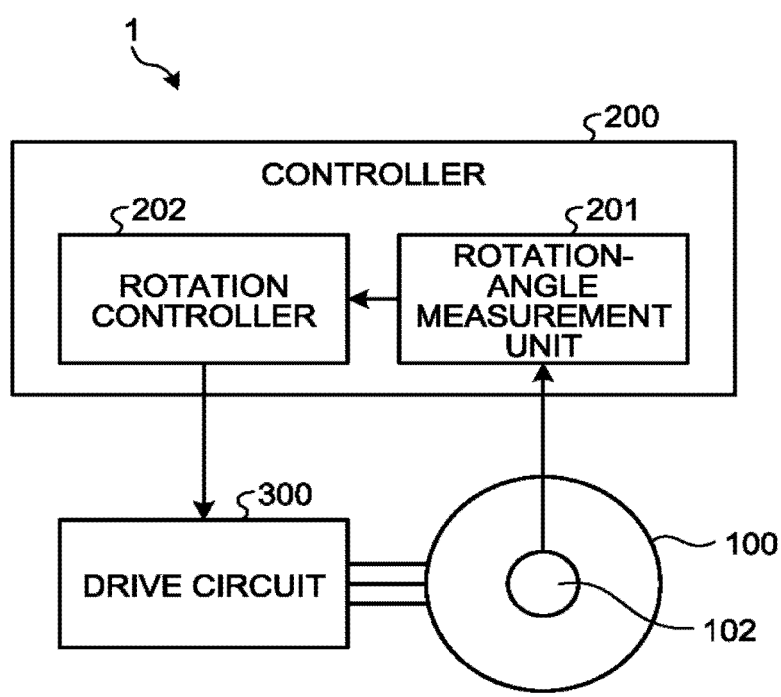
FIG. 7 is a schematic and exemplary block diagram of a rotary electric machine system including the rotary electric machine in the first embodiment.

FIG. 7 is a block diagram of a rotary electric machine system 1 including the rotary electric machine 100. As illustrated in FIG. 7, the rotary electric machine system 1 includes an angle sensor 102, a controller 200, and a drive circuit 300.

The angle sensor 102 includes, for example, a rotary encoder, and detects the rotation angle of the rotor 130 of the rotary electric machine 100. The rotation angle of the rotor 130 may be estimated based on the electrical power that is output by the drive circuit 300, which will be described later, and based on a physical model of the rotary electric machine 100, in place of the detection of the rotation angle by the angle sensor 102. Such estimation can be referred to as sensorless position estimation.

The controller 200 includes a rotation-angle measurement unit 201 and a rotation controller 202. The rotation-angle measurement unit 201 outputs rotation angle information based on the detection result of the angle sensor 102. The rotation controller 202, in accordance with a certain algorithm, acquires a command value corresponding to the rotation angle information, or to a desired value and the like from the outside, and controls the drive circuit 300 so as to apply the electrical power corresponding to the command value to the rotary electric machine 100. The controller 200 can perform, based on the detection result of the angle sensor 102 or based on the sensorless position estimation, angular feedback control of the rotary electric machine 100.

Figure 8:
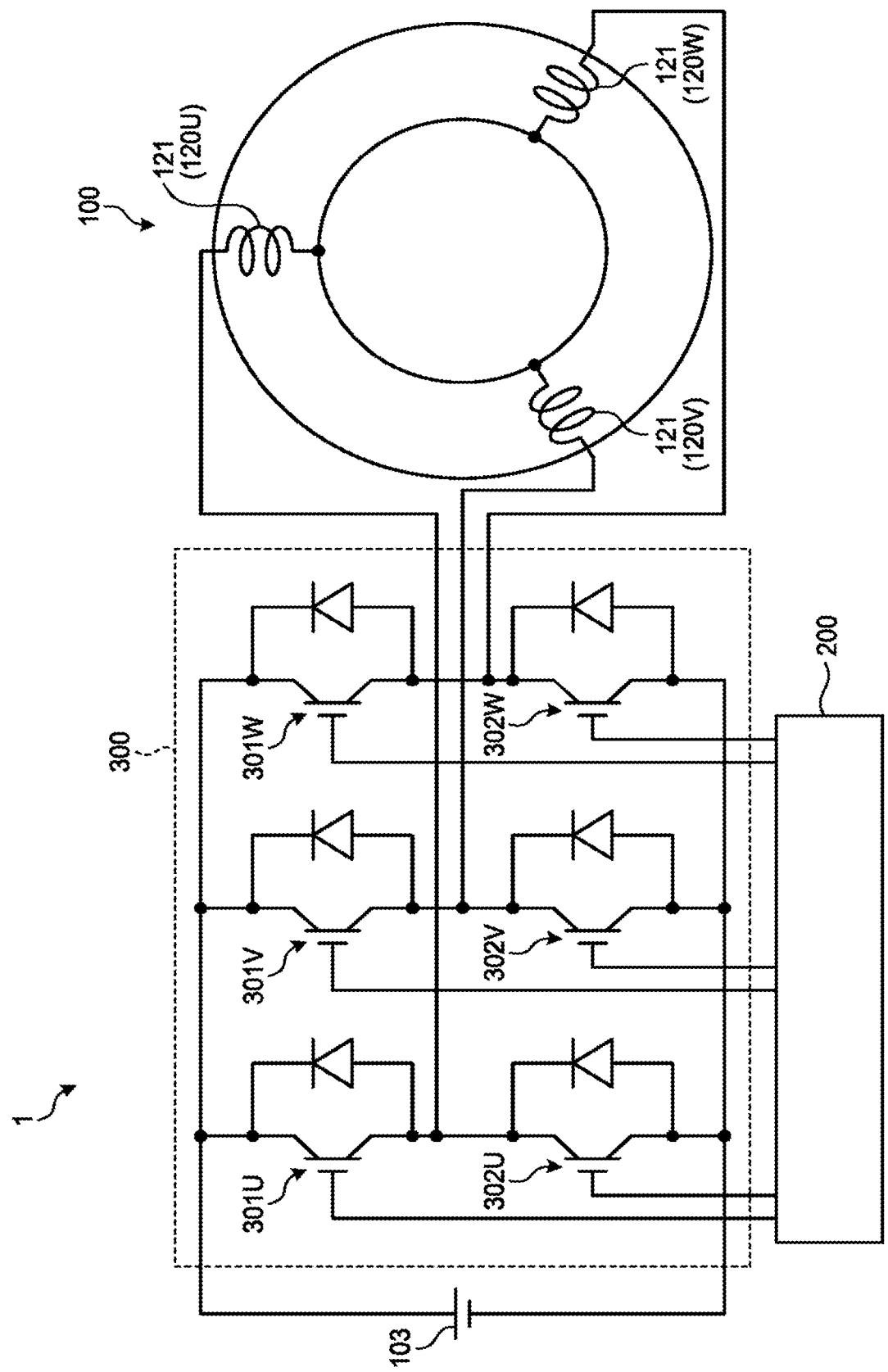
FIG. 8 is a schematic and exemplary circuit diagram of the rotary electric machine in the first embodiment and of a drive circuit thereof.

FIG. 8 is a configuration diagram of the drive circuit 300. As illustrated in FIG. 8, in the drive circuit 300, a battery 103 as a power source is connected. The drive circuit 300 includes a plurality of bridge-connected switching units 301U, 302U, 301V, 302V, 301W, and 302W. The switching of the switching units 301U and 302U changes the electrical power applied to the winding 121 of the stator 120U, the switching of the switching units 301V and 302V changes the electrical power applied to the winding 121 of the stator 120V, and the switching of the switching units 301W and 302W changes the electrical power applied to the winding 121 of the stator 120W. The switching units 301U, 302U, 301V, 302V, 301W, and 302W each include a switching element, and a diode. The switching element is an IGBT and the like, for example. The wire connection of a plurality of windings 121 in the rotary electric machine 100 is not limited to a Y-connection (star connection) as illustrated in FIG. 8, and may be other connections such as a delta connection and others. The drive circuit 300 is not limited to three phases. On the winding 121, a power amplification circuit may further be provided. As just described, the rotary electric machine 100 can constitute a known rotary electric machine system 1.

Second Embodiment

Figure 9:
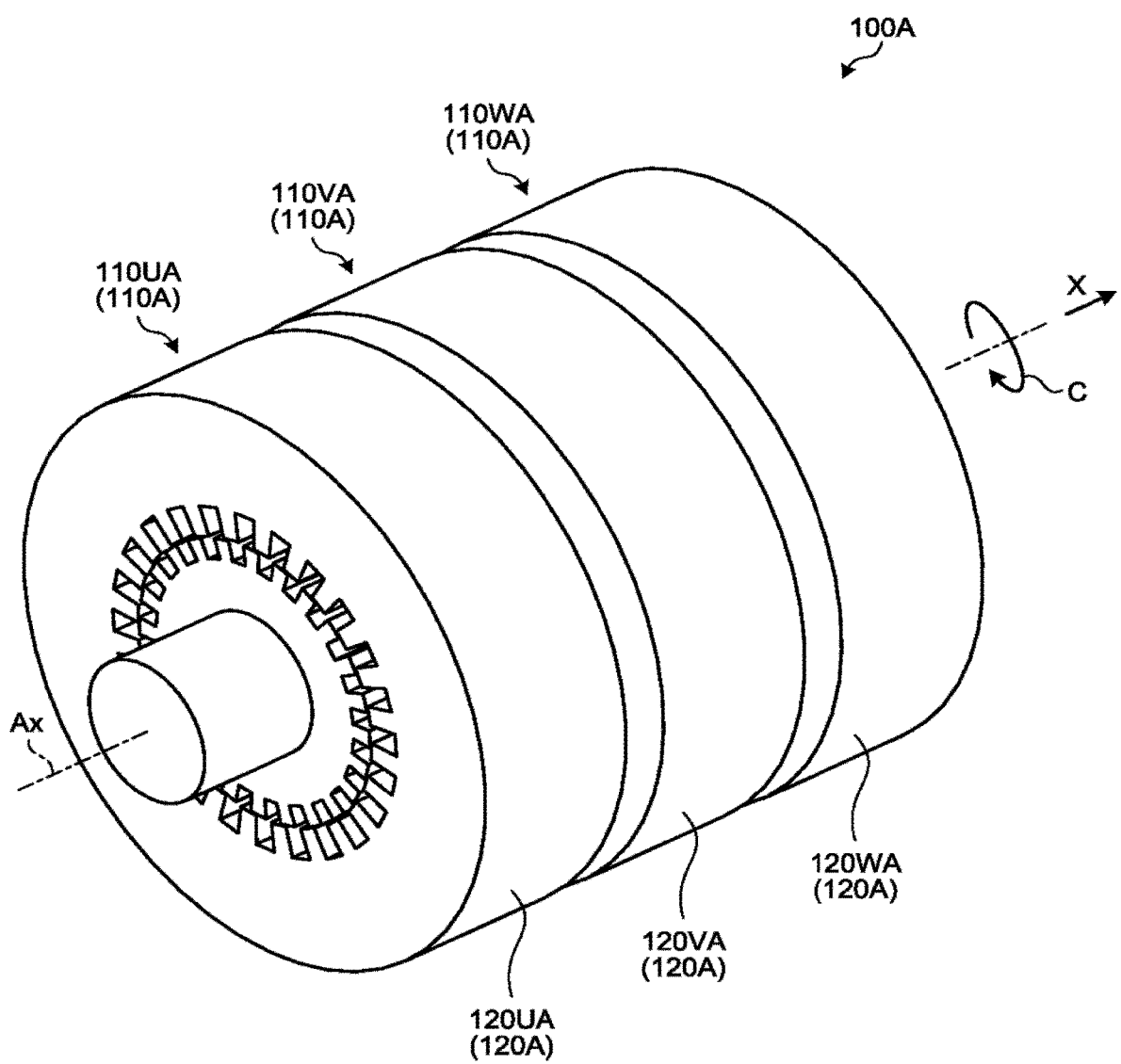
FIG. 9 is a schematic and exemplary perspective view of a rotary electric machine according to a second embodiment.
Figure 10:
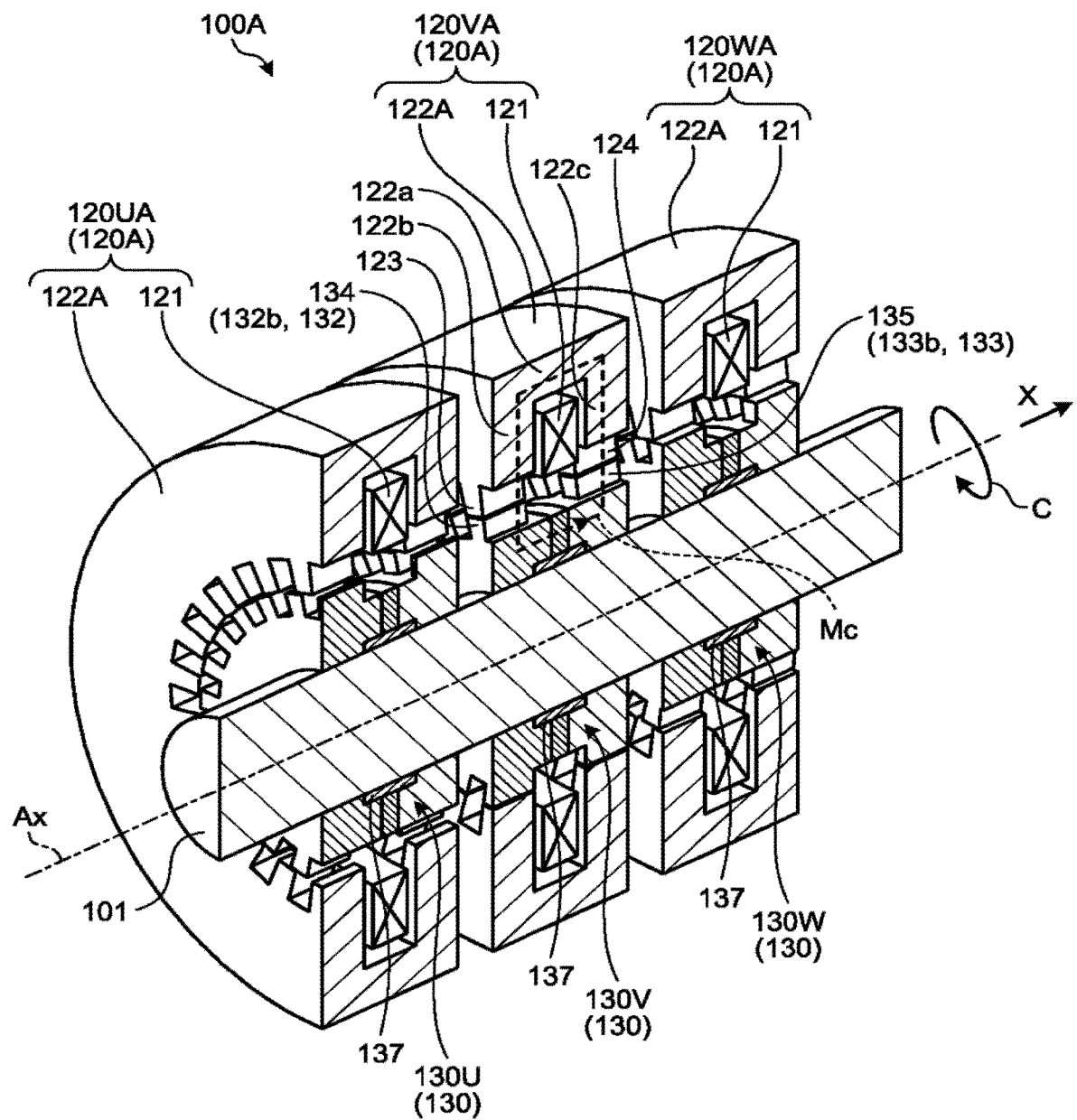
FIG. 10 is a schematic and exemplary perspective view illustrating a cross-section of the rotary electric machine in the second embodiment.

FIG. 9 is a perspective view illustrating a rotary electric machine 100A according to a second embodiment, and FIG. 10 is a perspective view illustrating a cross-section passing through the rotation center Ax of the rotary electric machine 100A. The rotary electric machine 100A in the second embodiment also is a transverse-flux rotary electric machine.

The rotor 130 in the second embodiment is the same as the rotor 130 in the first embodiment. However, in the second embodiment, the configuration of the iron core 122A of the stator 120A differs from the configuration of the iron core 122 of the stator 120 in the above-described first embodiment. In the second embodiment, the iron core 122A of the stator 120A (120UA, 120VA, 120WA) is configured in a disc shape centering around the rotation center Ax, and the shape of its cross-section along the radial direction is in a U-shape that is open inward in the radial direction. In the first embodiment, a magnetic pole 123 and a magnetic pole 124 are provided in line in the axial direction and a pair of the magnetic pole 123 and the magnetic pole 124 is provided on each of a plurality of iron cores 122. In the second embodiment, however, on a single iron core 122, magnetic poles 123 and magnetic poles 124 are respectively provided in line and spaced in the axial direction. Respective pairs of the magnetic poles 123 and the magnetic poles 124 are regularly spaced in the circumferential direction. A plurality of magnetic poles 123 is provided in line and regularly spaced in the circumferential direction, and a plurality of magnetic poles 124 is provided in line and regularly spaced in the circumferential direction. That the arrangement of the magnetic poles 123 and 124 is the same as that in the first embodiment.

The rotary electric machine 100A can also be provided with the same configuration as that of the first embodiment not depicted such as the slits 136, 138, and 139, the supporting member 137, and the insulation layers of the surface of the magnet 131 and of the supporting member 137, and can be composed of the materials of the same type. Thus, according to the second embodiment also, the same operation and effect as those based on the same configuration of the first embodiment can be obtained.

Furthermore, as in the foregoing, according to the second embodiment, because the number of components of the stator 120 is small, it has an advantage in that the labor and cost in manufacturing can be reduced as compared with the above-described first embodiment.

Other Modifications

In the rotary electric machines 100 and 100A in the first and second embodiments, the slit 136 is in parallel in the radial direction and the axial direction. The slit 136, however, does not need to be in parallel in the radial direction and the axial direction.

Furthermore, in the rotary electric machines 100 and 100A in the first and second embodiments, the slit 136 separates the entire area of the cross-section intersecting with the circumferential direction of the magnet 131. However, it is not limited thereto, and the slit 136 may separate the most part of the cross-section, preferably three-quarters or more thereof. In this case, however, because the magnet 131 is partially coupled at the position where the slit 136 is provided, an eddy current does not away completely.

While the gap length of the slit 136 is preferably narrow, it is undesirable that both ends of the slit 136 come in contact with each other due to the expansion and contraction of the respective members due to the changes in temperature. Accordingly, in a configuration in which there is no inclusion or positioning member between the slit 136, at the upper limit or the lower limit of the temperature range that the rotary electric machine 100 is used, the gap length is set such that a certain gap length larger than zero is ensured.

In the rotary electric machines 100 and 100A in the first and second embodiments, the rotor is what is called an inner rotor that is located inside in the radial direction of the stator. However, the configuration of the embodiments may be what is called an outer rotor in which the rotor is located outside in the radial direction of the stator.

While the rotary electric machines 100 and 100A in the first and second embodiments are a radial gap motor for which the normal line of the opposing surfaces of the rotor and the stator is in the radial direction, the configuration of the embodiments is applicable to an axial gap motor for which the normal line of the opposing surfaces of the rotor and the stator is in the axial direction. In the axial gap motor, the magnetic pole of the stator and the magnetic pole of the rotor face each other in the axial direction with a gap left, the shape of the stator core is a U-shape that is open in one of the axial direction, and the winding 121 passes through the U-shaped portion.

While the rotary electric machines 100 and 100A in the first and second embodiments are in a three-phase structure, the configuration of the embodiments is also applicable to the rotary electric machines of the other structures such as a four-phase structure and a five-phase structure in addition to the three-phase structure.

Application Example to Vehicle

Figure 11:
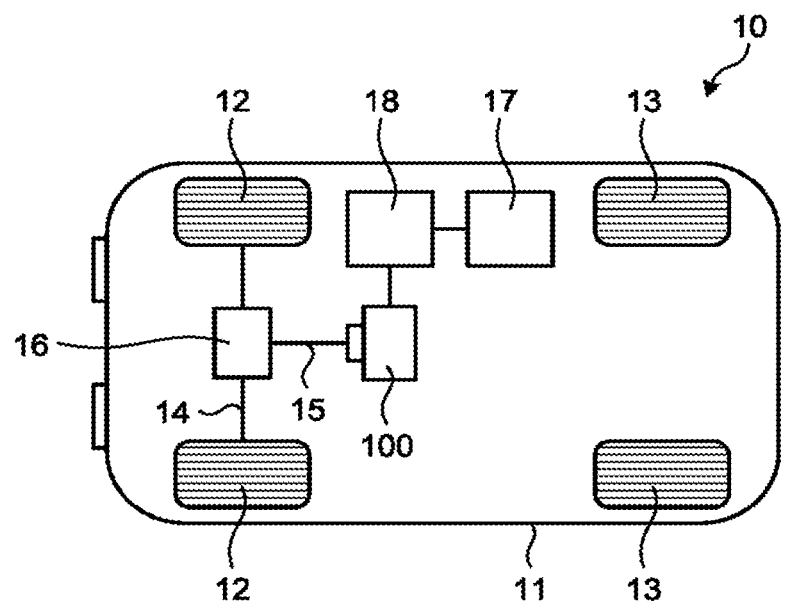
FIG. 11 is a schematic and exemplary configuration diagram of a vehicle including the rotary electric machine in the embodiments.

FIG. 11 is a schematic configuration diagram of a vehicle 10 including the rotary electric machine 100. The vehicle 10 (machine) can include the rotary electric machine 100 or 100A of the above-described embodiments or the modifications. In the example in FIG. 11, the vehicle 10 is what is called a hybrid vehicle. A vehicle body 11 of the vehicle 10 has two front wheel 12 and two rear wheels 13. The front wheels 12 are driving wheels (operation unit) and are connected to the rotary electric machine 100 via drive shafts 14, a differential gear 16, and a drive shaft 15. The drive shaft 15 is coupled with the shaft 101 (the rotor 130, not depicted in FIG. 11) of the rotary electric machine 100. The vehicle 10 further includes an engine 17, and the engine 17 is coupled with the rotary electric machine 100 or the drive shaft 15 via a coupling shaft 18. With such a configuration, both the torque of the engine 17 and the power of the rotary electric machine 100 are transmitted to the front wheels 12.

Figure 12:
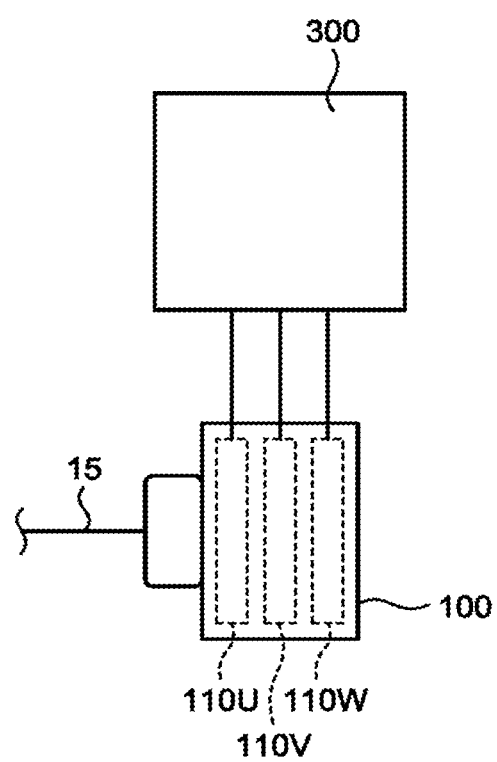
FIG. 12 is a schematic and exemplary configuration diagram of the rotary electric machine installed in the vehicle in the embodiments.

FIG. 12 is a configuration diagram of the rotary electric machine 100 installed in the vehicle 10. As illustrated in FIG. 12, the power lines of the respective phases of the drive circuit 300 are connected to the windings 121 (not depicted in FIG. 12) of the respective driving elements 110U, 110V, and 110H of the rotary electric machine 100. The rotary electric machine 100 operates as a motor when driving the vehicle, and operates as a power generator when regenerating energy.

The vehicle 10 is not limited to a hybrid vehicle, and may be an electric vehicle, a fuel-cell vehicle, and others having no engine 17.

Application Example to Wind-Power Generator

Figure 13:
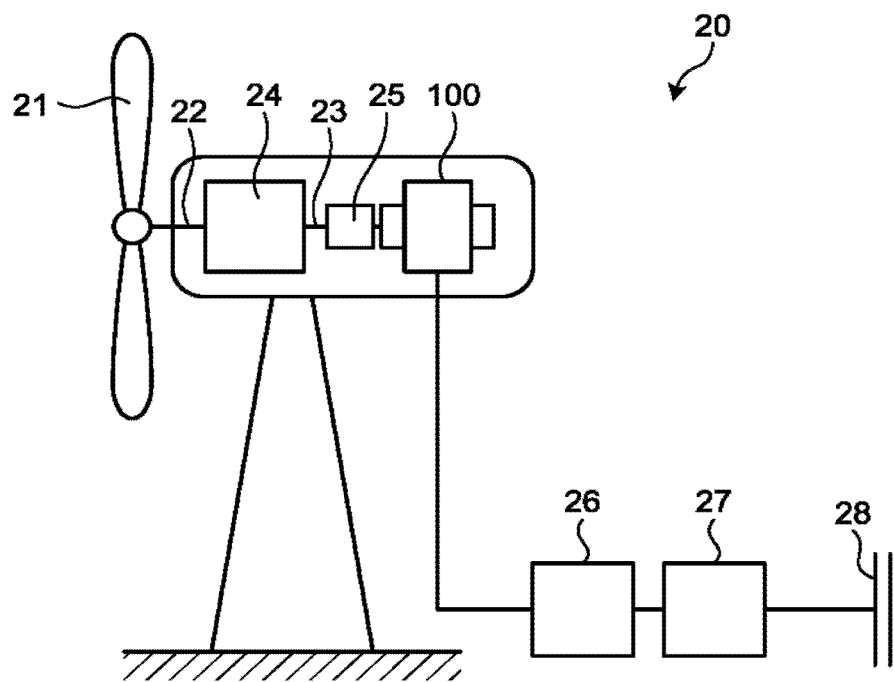
FIG. 13 is a schematic and exemplary configuration diagram of a wind-power generator including the rotary electric machine in the embodiments.

FIG. 13 is a schematic configuration diagram of a wind-power generator 20 including the rotary electric machine 100. The wind-power generator 20 (machine) can include the rotary electric machine 100 or 100A of the above-described embodiments or the modifications. In the example in FIG. 13, blades 21 (operation unit) of the wind-power generator 20 are rotated by wind power, and the power is transmitted to a speed-increasing gear 24 via a rotating shaft 22. The power of the speed-increasing gear 24 is transmitted to the shaft 101 (the rotor 130, not depicted in FIG. 13) of the rotary electric machine 100 via a rotating shaft 23 and a shaft coupling 25, and by the relevant power, the rotary electric machine 100 generates electrical power. The generated electrical power is supplied to an electrical power system 28 via an electrical transformer 26 and a system protection device 27.

The rotary electric machine 100 or 100A in the above-described embodiments or the modifications can also be applied to general power generators including a hydraulic power generator, in addition to such a wind-power generator 20, for example.

Application Example to Elevator

Figure 14:
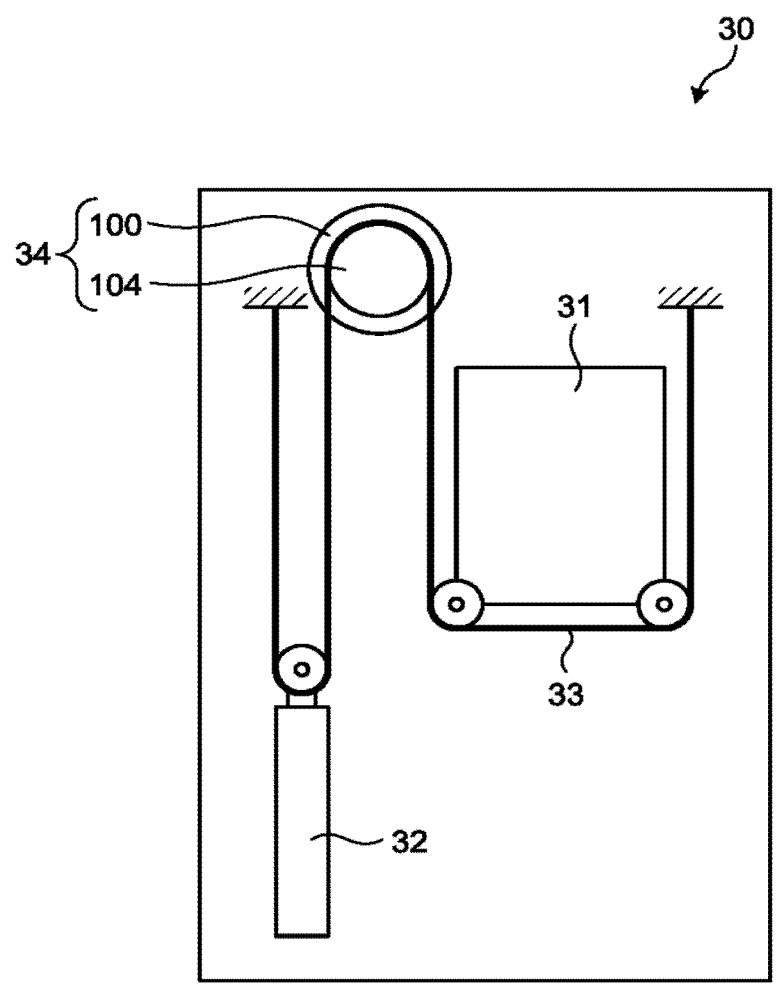
FIG. 14 is a schematic and exemplary configuration diagram of an elevator including the rotary electric machine in the embodiments.

FIG. 14 is a schematic configuration diagram of an elevator 30 including the rotary electric machine 100. The elevator 30 (machine) can include the rotary electric machine 100 or 100A of the above-described embodiments or the modifications. In the example in FIG. 14, the elevator 30 includes a winch 34, a car 31 (operation unit), a counterweight 32, and a rope 33. The winch 34 includes the rotary electric machine 100 and a sheave 104. The rope 33 is wound around a pulley of the car 31, the sheave 104 (operation unit) of the winch 34, and a pulley of the counterweight 32. Both ends of the rope 33 are each fastened to separate locations of a building and the like. When the rotary electric machine 100 as a motor of the winch 34 operates, the sheave 104 is rotated by the generated torque of the rotary electric machine 100. The winch 34, by rolling up or rolling down the rope 33 by utilizing frictional force between the sheave 104 and the rope 33, can raise or lower the car 31. It can be said that the winch 34 also is one example of a machine.

Application Example to Robot

Figure 15:
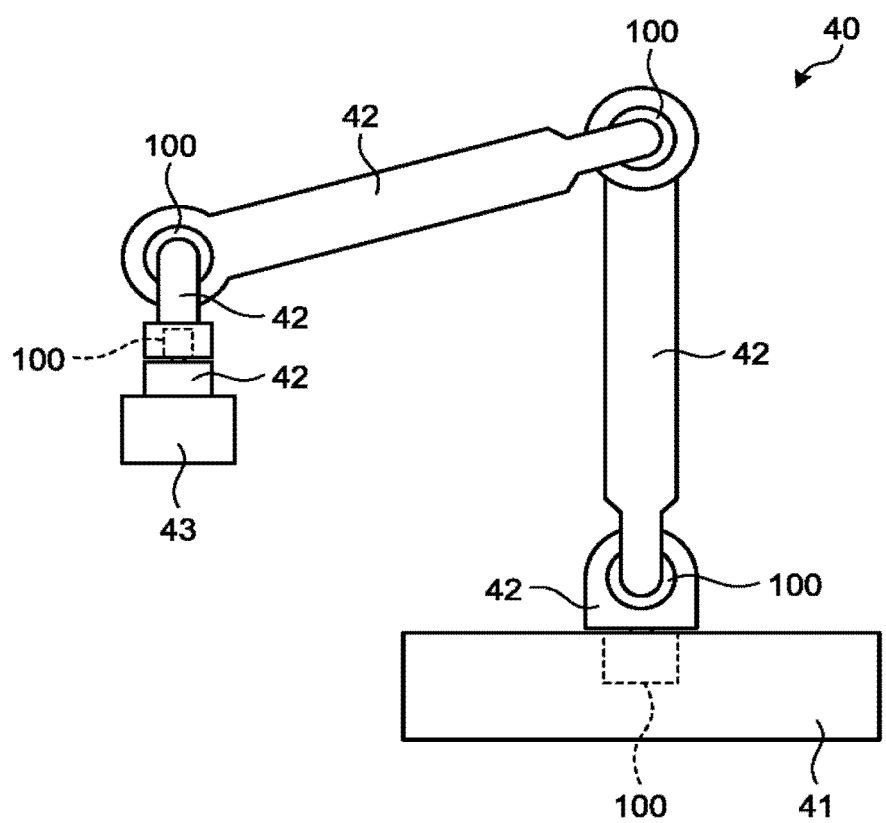
FIG. 15 is a schematic and exemplary configuration diagram of a robot including the rotary electric machine in the embodiments.

FIG. 15 is a schematic configuration diagram of a robot 40 including the rotary electric machine 100. The robot 40 (machine) can include the rotary electric machine 100 or 100A of the above-described embodiments or the modifications. In the example in FIG. 15, the robot 40 is an articulated robot and includes a base 41 and a plurality of movable portions 42 (operation unit). The rotary electric machine 100 is provided on each joint portion where two movable portions 42 are rotatively coupled. The rotary electric machine 100 is fixed to the one of the movable portions 42 of the joint portion, and rotates the other of the movable portions 42 relatively to the one of the movable portion 42. The robot 40 can control the location, posture, and behavior (moving velocity or the like) of the movable portion 42 located at the distal end of an articulated arm by controlling a plurality of rotary electric machines 100, and thus the robot 40 can access an object 43 at a desired location and carry the object.

The rotary electric machine 100 or 100A in the above-described embodiments or the modifications can also be applied to, in addition to such a robot 4C, general robots including a parallel link robot, a Cartesian robot, a running (walking) robot, and an assistant robot, for example. The rotary electric machine 100 or 100A in the above-described embodiments or the modifications can also be installed in machines such as general machines, electrical machines, transportation machines, and precision machines, in addition to the machines illustrated in the present disclosure, for example.

While certain embodiments have been described, these embodiments have been presented by way of example only, and are not intended to limit the scope of the inventions. Indeed, the novel embodiments described herein malt be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A rotary electric machine comprising: a stator; and a rotor capable of rotating around a rotation center, wherein the stator includes an annular winding centering the rotation center, and a stator core, arranged along the annular winding, including a plurality of first stator magnetic poles arranged being spaced apart from one another in a circumferential direction of the rotation center and a plurality of second stator magnetic poles arranged being spaced apart from one another in the circumferential direction, and the rotor includes an annular first rotor core including a plurality of first rotor magnetic poles that are arranged being spaced apart from one another in the circumferential direction and each face the first stator magnetic poles, an annular second rotor core including a plurality of second rotor magnetic poles that are arranged being spaced apart from one another in the circumferential direction and each face the second stator magnetic poles, and an annular magnet located between the annular first rotor core and the annular second rotor core and provided with a slit-like magnet separation portion that separates at least a part thereof in the circumferential direction and suppresses an eddy current flowing through the annular magnet along the circumferential direction wherein the annular magnet is not connected and fully separated by the slit-like magnet separation portion;

and wherein at least one of the annular first rotor core and the annular second rotor core is provided with a slit-like iron-core separation portion adjacent to the slit-like magnet separation portion in one direction out of an axial direction of the rotation center and a radial direction of the rotation center and configured to separate at least one of the annular first rotor core and the annular second rotor core in the circumferential direction.

2. The rotary electric machine according to claim 1, further comprising an insulation layer on a surface of the annular magnet.

3. The rotary electric machine according to claim 1, wherein the slit-like magnet separation portion includes an insulative inclusion located therein.

4. The rotary electric machine according to claim 1, further comprising a supporting member configured to support the annular magnet and to be composed of an insulative material for at least a contact region contacting with the annular magnet.

5. The rotary electric machine according to claim 1, further comprising a nonmagnetic shaft adjacent to the annular magnet and configured to rotate around the rotation center together with the rotor.

6. The rotary electric machine according to claim 1, wherein at least one of the stator core, the annular first rotor core, and the annular second rotor core is composed, at least partially, of a powder magnetic core or a ferrite core.

7. The rotary electric machine according to claim 1, wherein at least one of the stator core, the annular first rotor core, and the annular second rotor core is composed, at least partially, of a ferromagnetic body having magnetic anisotropy.

8. A rotary electric machine system comprising:
the rotary electric machine according to claim 1;
a drive circuit configured to supply electrical power to the rotary electric machine; and
a controller configured to control operation of the drive circuit.

9. A machinery comprising the rotary electric machine according to claim 1.

* * * * *